No. 796,926. PATENTED AUG. 8, 1905.
I. E. McELROY.
KNOTTER FOR A GRAIN HARVESTER AND BINDER.
APPLICATION FILED MAY 28, 1904.

Witnesses
Isaac E. McElroy, Inventor.
by C. A. Snow & Co.
Attorneys

UNITED STATES PATENT OFFICE.

ISAAC ERWIN McELROY, OF MUSCATINE, IOWA.

KNOTTER FOR A GRAIN HARVESTER AND BINDER.

No. 796,926.      Specification of Letters Patent.      Patented Aug. 8, 1905.

Application filed May 28, 1904. Serial No. 210,287.

*To all whom it may concern:*

Be it known that I, ISAAC ERWIN MCELROY, a citizen of the United States, residing at Muscatine, in the county of Muscatine and State of Iowa, have invented a new and useful Knotter for Grain-Binders, of which the following is a specification.

This invention relates to improvements in the knotter proper, which acting reciprocally with other parts of the knotting mechanism performs the function of tying the knot in the band or string which is placed around the bundle or sheaf of grain. Knotters of this class usually comprise a rotary spindle provided at one end with two lateral jaws, one of which is movable to and from the other, so that when the device is rotated against the cord the latter will be wound around the jaws in the form of a loop and the ends will be grasped between them and drawn through the loop as it slides over these ends in discharge from the knotter. As commonly constructed, these jaws or bills are oftentimes combined with a spring to hold the movable jaw closed.

Among the objects of the invention are to secure a positive action, to avoid bow-knots, to provide a knotter which will be unaffected by the difference in the size of twine used, to produce a knotter practical in its operation and not easily broken or worn out, and to lessen the necessity of or to obviate the necessity of having a closing-spring.

With these and other ends in view the invention consists in the improved construction and novel arrangement and combination of parts, which will be hereinafter fully described, and particularly pointed out in the claim.

In the accompanying drawings has been illustrated a simple and preferred form of embodiment of the invention, it being, however, understood that no limitation is necessarily made to the precise structural details therein exhibited, but that the right is reserved to any changes, alterations, and modifications to which recourse may be had within the scope of the invention and without departing from the spirit or sacrificing the efficiency of the same.

Figure 1:
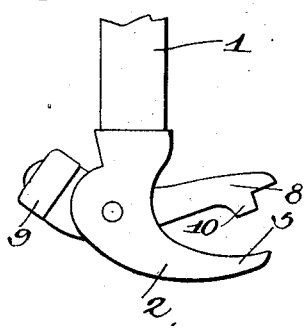
Figure 2:
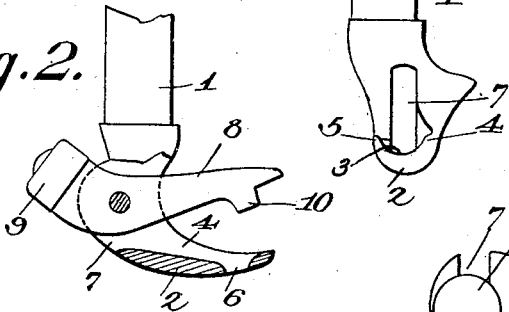
Figure 3:
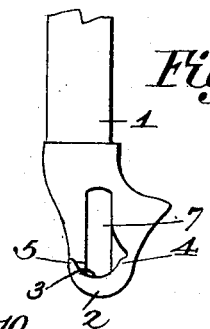
Figure 4:
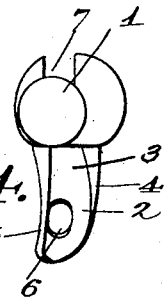
Figure 5:
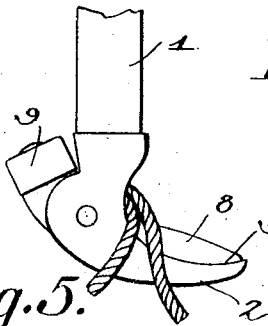
Figure 6:
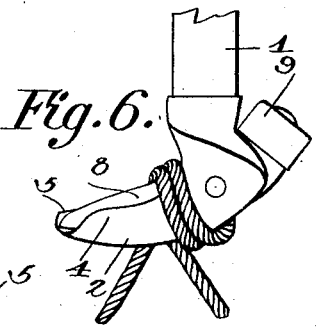
Figure 7:
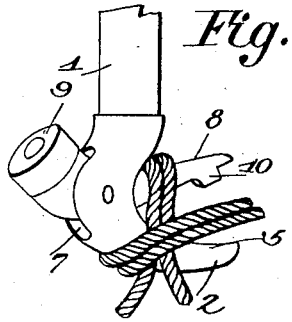
Figure 8:
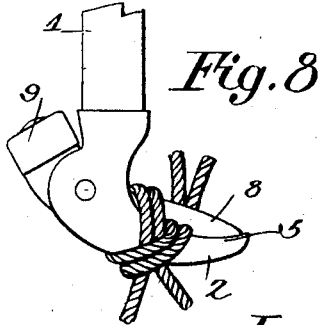
Figure 9:
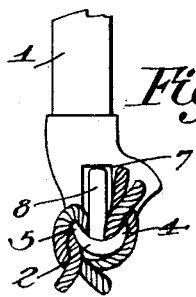

In said drawings, Figure 1 is a side elevation of the knotter removed from the machine. Fig. 2 is a side elevation, partly in section. Fig. 3 is an end view showing the knotter with the movable jaw detached. Fig. 4 is a top plan view with the movable jaw detached. Fig. 5 is a side view showing the knotter with the twine in position ready to start turning. Fig. 6 is a side view showing the knotter halfway turned. Fig. 7 is a view showing the knotter a little over three-fourths turned and with the movable jaw open to receive the ends of the twine. Fig. 8 shows the movable jaw closed upon the ends of the twine. Fig. 9 is an end view showing the knotter at the moment when the knot leaves it.

Corresponding parts in the several figures are indicated by like characters of reference.

1 designates the rotary spindle, which carries the knotter. 2 is the lower stationary jaw, which extends substantially at right angles from the end of the spindle. Said jaw is curved longitudinally, as will be clearly seen in Fig. 1, and it is also slightly curved transversely, as will be best seen by reference to Fig. 4 of the drawings, and it is provided in its upper side with a longitudinal groove or cavity 3, extending through the entire length thereof, one of the side walls 4 of said groove merging with the base of the jaw at a short distance from the point of the latter, while the other side wall 5 is extended to the extreme point of the jaw. This construction will be clearly seen in Fig. 4. The jaw 2 is provided at some distance from the point thereof with an aperture 6, which is disposed adjacent to the side wall 5. The base of the jaw 2, or the portion of said jaw which is joined to the spindle, is provided with a slot 7, in which is pivotally mounted the movable jaw 8, which has a rearward extension provided with an antifriction-roller 9. This construction is common in devices of this class, the roller 9 being for engagement with a stationary cam, whereby the movable jaw is moved to an open position; but inasmuch as this mechanism is no part of the invention it has been omitted from the drawings.

The movable jaw is of much less width than the groove 3 upon the stationary jaw, and its normal position when closed is adjacent to the side wall 5, which extends to the point of the jaw 2, as above stated. The said movable jaw is provided on its under side with a lug or shoulder 10, adapted to enter into the aperture 4. Said movable jaw, while its under side is of a contour approximating the contour of the opposing face of the stationary jaw, is not intended to close tightly against the latter, the only point of actual contact being at the points of the respective jaws which extend beyond the aperture 6 and the lug 10, respectively. Thus while the jaws when closed together upon the ends of the twine will hold the latter with a sufficient degree of tenacity they will not grasp it so tightly as to prevent the knot from being readily stripped at the proper time after it has been formed.

It will be particularly observed that while the ends of the twine will be kept tightly between the jaws, and especially between the movable jaw and the adjacent wall 5 of the stationary jaw, there will be considerable play or open space between the movable jaw and the wall 4, which terminates at a distance from the extremity of the jaw 2. Owing to this peculiar construction and conformation of the parts, the stripping of the knot will be greatly facilitated. Another advantage gained by this peculiar construction is that the jaws of the knotter will operate with equal facility and certainty upon twine of various dimensions.

It will be seen that in this improved knotter dependence is placed for the retention of the ends of the twine upon the drawing of the loop about the jaws. This will hold the jaws firmly enough to prevent the release of the twine by accident; but since the surfaces between which the ends of the twine are held are quite smooth, the stationary jaw being hollowed in a regular curve, the device will not hold the twine ends so firmly as to prevent their yielding sufficiently to permit the knot to pass freely over the end of the tier, as would be the case if the cavity in the stationary jaw were made narrow to fit the movable jaw.

By placing the movable jaw adjacent to the side wall 5 which is nearest to the side at which the cord or twine enters from the bundle sufficient room is provided for the ends of the twine to double down between the movable jaw and the flange or side wall 4 of the rigid jaw in order that the loop may slide over the twine ends with little or no resistance.

The improved knotter is mounted in the ordinary manner and operated in conjunction with the ordinary and well-known mechanisms of the usual twine holding and cutting devices. The knotter in operation makes practically an entire revolution, causing the twine to be twisted in the form of a loop around the two jaws. At or near the end of the revolution the movable jaw is opened, the ends of the twine are laid between the two jaws, and the pivoted jaw is permitted to close, the successive stages of the operation being shown in Figs. 5, 6, 7, 8, and 9. The parts being in the final position the twine is strained in the direction of the point of the knotter by the action of parts tending to discharge the bundle, or it may be subjected to the action of an ordinary stripping device or otherwise urged toward the outer end of the knotter. The loop encircling the jaws and retaining them in a closed position passes off the ends of the jaws, the ends of the twine being meanwhile retained between the jaws and drawn with a positive action through the loop, so that the knot is completed in the ordinary manner.

Having thus described the invention, what is claimed is—

In a knot-tying device, a spindle mounted for rotation and carrying a stationary jaw and a movable jaw adapted to close together; said stationary jaw being curved longitudinally and transversely and provided at a distance from its extremity with an aperture and also provided with a longitudinally-disposed wide groove or cavity, one of the side walls of which terminates at a distance from the point of the jaw and merges with the latter; and said movable jaw being provided with a lug adapted to engage the aperture in the stationary jaw.

In testimony whereof I have signed my name to this specification in the presence of two subscribing witnesses.

ISAAC ERWIN McELROY.

Witnesses:
P. R. BAKER,
HARRY DALBARHIDE.